Sept. 19, 1967   J. M. LEACH   3,342,307
MATERIAL HANDLING CONVEYORS
Filed July 13, 1966
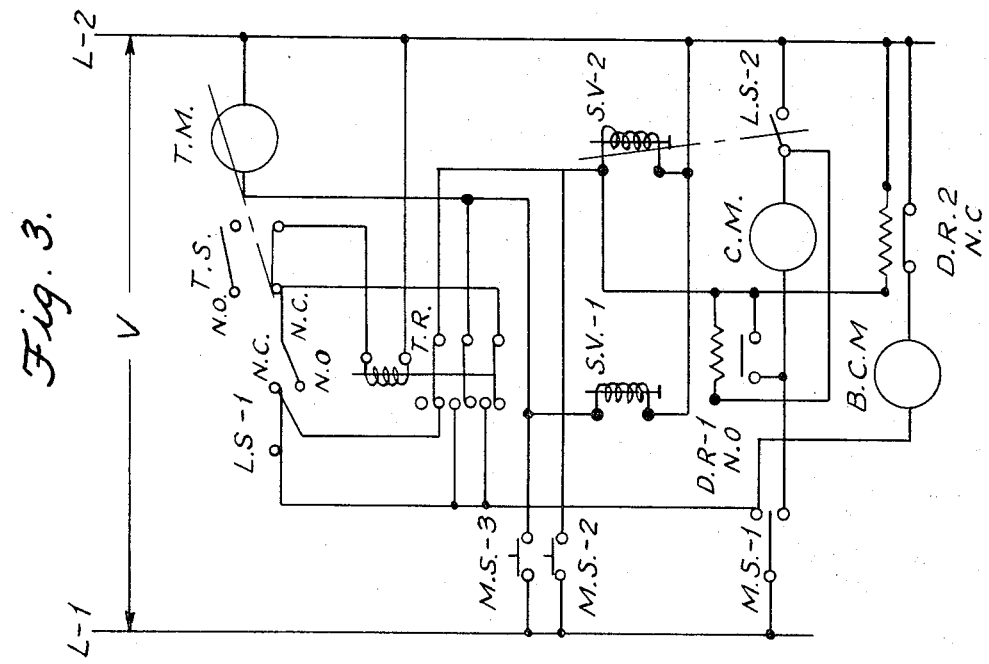
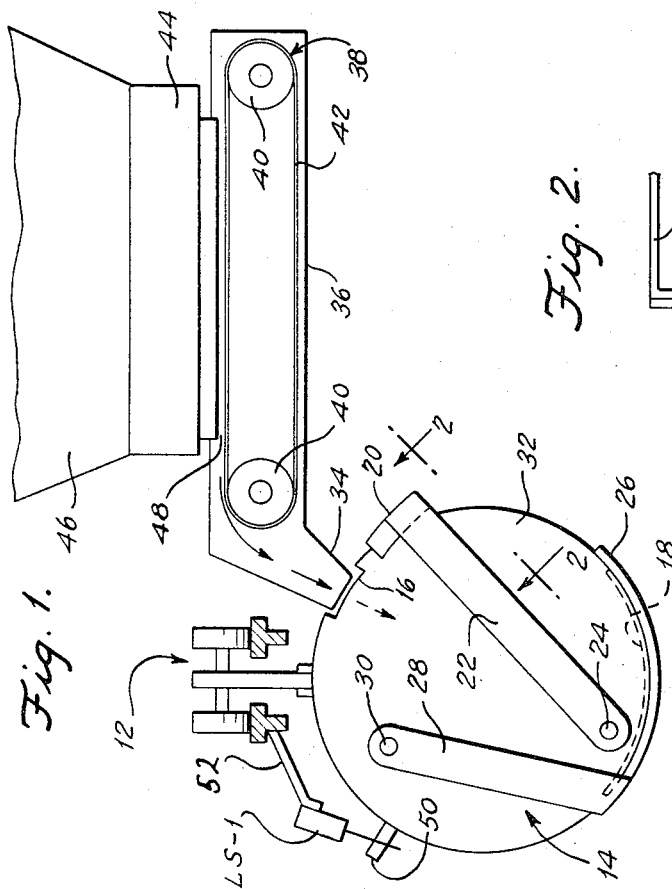
INVENTOR.
John M. Leach

United States Patent Office 3,342,307
    Patented Sept. 19, 1967

3,342,307
    MATERIAL HANDLING CONVEYORS
    John M. Leach, P.O. Box 341, Port Jefferson,
    N.Y. 11777
    Filed July 13, 1966, Ser. No. 564,958
    8 Claims. (Cl. 198—58)

ABSTRACT OF THE DISCLOSURE

The present invention comprises a main power driven conveyor which propels a series of material carrying magazines for movement therewith. The magazines are covered and each is provided with a narrow filling opening along one side near the top. A feeder conveyor is positioned near said opening and provided with a drive for moving said feeder conveyor at a speed so as to forcibly directly project material off of its end and through said narrow receiving opening substantially without contacting anything before passing through said opening and at a higher volumetric rate than could be obtained by gravity flow. A movable closure is provided for said opening and means for opening said closure prior to reaching said feeder conveyor and for closing said closure after said opening has passed said feeder conveyor. Means are provided for supplying material to said feeder conveyor which is preferably a gate valve of the type which is dribble-free for bulk material when closed.

---

The present invention relates to conveyors. More particularly, it relates to bulk handling conveyors.

It is the main object of the present invention to provide a bulk handling conveyor comprising a carrier or supporting conveyor carrying spaced apart magazines for the material and provided with unique facilities for rapidly filling the magazines without spilling any material in the spaces between the magazines.

The present invention is in part a continuation of the inventions disclosed in prior applications Ser. No. 404,078, filed Oct. 15, 1964, now Patent No. 3,266,621, and Ser. No. 550,558, filed May 16, 1966, and all of the objects enumerated in these former applications are also objects of the present invention.

Other objects and advantages of the present invention will become apparent to those skilled in the art upon recourse to the following description of what are now considered the preferred embodiments of the present invention.

In the drawings:

FIG. 1 is a diagramatic view of the conveyor of the present invention taken substantially at right angles to the direction of run of the main or supporting conveyor;

FIG. 2 is a fragmentary view of a filling opening closure for a magazine of the present invention taken substantially on the plane indicated by line 2—2 of FIG. 1 and looking in the direction of the arrows, and FIG. 3 is a schematic view of the electrical circuitry which can be used in the present invention.

The conveyor 12 is power driven by a drive not shown and is the same type as disclosed in application Ser. No. 404,078, now Patent No. 3,266,621, and supports a series of material carrying magazines 14 also as shown generally in said application.

Each magazine 14 is provided with a filler opening 16 in its side rear the top and a door closure for the filler opening which consists of a curved plate 20 having a curvature corresponding to that of the body 32 of the magazine 14. Each plate 20 is supported at each end by an arm 22 suitably pivotally attached to the magazine body 32 as shown at 24.

The discharge opening 18 is also provided with a closure consisting of a similarly curved plate 26 supported each end by an arm 28 suitably pivoted to the body 32 as shown at 30.

The lengths of the pairs of arms 22 and 28 are made such and the positions of the pivotal connections 24 and 30 are selected so that as the closures swing into fully closed position they are sprung slightly outwardly so as to both tightly seal the opening and also retain the closures in closed positions and thereby dispense with the need for any closure latches or the like. Suitable gaskets can be disposed between each closure and the body 32 if desired.

The closures are preferably moved into open or closed position by cams and followers as disclosed in application Ser. No. 404,078, now Patent No. 3,266,621.

It will be noted that the filler openings 16 are made narrow. This is to avoid decreasing the carrying capacity of each magazine any more than necessary; it being obvious that material can not be filled into the magazines above level of the lower side of the opening 16. Each opening 16 will normally be made coextensive in length with the magazine 14.

Because the openings 16 are narrow, materials which are not free flowing may tend to bridge across any chute supplying material to the opening. Also, sluggish materials would not flow into the magazines with sufficient speed to produce the high volumes of materials frequently required. The following equipment completely eliminates both of these undesirable possibilities.

The filler chute 34 is made very short and expands into a casing 36 as shown, A belt conveyor 38 comprising two pulleys 40 and a belt 42 which is preferably endless is suitably mounted in the casing and driven by a prime mover including an electric motor which within itself forms no part of the present invention and is not shown. The width of the belt is substantially coextensive with the length of the opening 16 in the magazines.

A gate valve 44 is positioned above the belt conveyor 42 and is supplied with material by any suitable source such as the hopper 46. The gate valve is made of less width than the belt so as to avoid material building up along the edges and working underneath the belt. The valve length is made as long as required to avoid any bridging of the material in the hopper and this length will be controlled by the characteristics of the material. That is, sluggish material will require a relatively long length compared to free flowing material. A test of each material not previously conveyed will be required to accurately establish the minimum valve length for the material in question.

The valve used is preferably of the type disclosed in application Ser. No. 550,558, filed May 16, 1966 because of the "dribble-free" quality of that valve.

The space 48 between the belt 42 and valve 44 is selected so that movement of the belt under the valve will collect a thin but uniform layer of the material on the belt. This space may be made adjustable in any conventional manner if so desired.

The gate valve 44 is preferably operated by some prime mover, for example an air cyclinder not shown here.

In the operation of the present invention, by trial a speed of movement of the belt 42 will be selected so that the layer of material carried on it will be thrown off at the end in a trajectory which will carry it through the chute 34 without directly striking anything and into the interior of the magazine. The speed of movement of the belt will be controlled by any conventional type of mechanical or electrical variable speed device not shown.

In this manner a very large volume of material can be moved through the small filler opening 16 into the magazines without bridging caused by frictional contact between the material and the sides of the chute 34, and a large opening which would reduce the capacity of the magazines is avoided.

The correct belt speed having been determined, an empty magazine will be carried along by conveyor 12 until a filler opening is positioned directly under spout 34 when the conveyor 12 will be stopped, the valve gate 44 will be opened and the belt conveyor 38 will be started. Just before the magazine is completely filled up to the lower edge of filler opening 16 the gate valve 44 will be closed, a few seconds later the belt conveyor 38 will stop and a second or so later the conveyor 12 will start to bring another empty magazine up under the spout 34 and the above cycle will be repeated. The continued movement of the belt conveyor 38 after the gate valve 44 closes insures that all material is discharged off of the belt before the conveyor 12 starts which leaves nothing to fall through the chute 34 between magazines. The "dribble-free" nature of the valve 44 insures that no material dribbles onto the belt conveyor 38 after the valve 44 closes which removes all possibility that any material will be remaining on the belt conveyor when it stops. This combination of features assures a clean operation with no spill-through between magazines.

It is preferable that the above described operation be carried out automatically which can be effected with any desired electrical circuitry and a now preferred circuit diagram is shown in FIG. 3. A normally closed (N.C.) normally open (N.O.) limit switch (L.S.–1) is suitably mounted such as by means of a bracket 52 from a track element of the conveyor 12 as shown in FIG. 1 so as to be tripped by an extension 50 suitably carried by each magazine when a magazine is positioned directly under the chute 34.

When operation is to be started, the master switch 1 (M.S.–1) shown in FIG. 3 is moved to the upper position. The lower position is to run the carrying conveyor 12 when desired without carrying any material. Closure of M.S.–1 completes a circuit through the N.C. contact of L.S.–1, unless the switch is tripped at this time by the extension 50 which is very unlikely because the extension 50 trips and then releases the switch as it moves by the extension while stopping. From the N.C. contact of L.S.–1 a circuit is carried through one set of contacts of a triple double throw relay T.R. to S.V.–2 which is the solenoid air valve which causes the air cylinder which operates gate valve 44 to close the valve if it is open which would be unlikely at this time. The circuit is then carried to a normally open delay relay D.R.–1 and then through N.O. limit switch L.S.–2 to the other side of the line L–2, L.S.–2 is suitably placed so as to be closed when gate valve 44 closes and to this end can be operated by any external moving part of the gate valve 44 as it closes. L.S.–2 will be closed at this time because the gate valve 44 is closed.

The relay D.R.–1 can be any desired type of time delay relay but a preferred type is a heat actuated relay sold on the open market under the trade name "Amperite." The completion of a circuit through D.R.–1 causes it to close in about three seconds which completes a circuit through the motor for conveyor 12, C.M. which causes the conveyor 12 to start.

When the extension 50 on the nearest magazine 14 to the spout 34 trips L.S.–1 a circuit will be made through its N.O. contact to the N.C. side of the timer switch T.S. to the coil of T.R. to L–2 which will actuate T.R. Actuation of T.R. sets up a holding circuit for itself around L.S.–1 from the N.C. contact of T.S. to the lower contacts of T.R. to M.S.–1 which means that T.R. will remain activated after the extension 50 releases L.S.–1.

When T.R. actuated, a circuit was also established from M.S.–1 through the middle contacts of T.R. to the timer motor T.M. which controls T.S. to L–2 which started the motor T.M. The same contacts also completed a circuit through S.V.–1 which is the solenoid valve which controls the air cylinder to open the gate valve 44 and then to L–2 which actuated S.V.–1 to open the gate valve 44.

When T.R. actuated, it also broke the circuit to S.V.–2 so that S.V.–1 could operate and the opening of gate valve 44 opened L.S.–2 which stopped the motor C.M. for conveyor 12. This also broke the circuit to N.C. D.R.–2 which caused the belt conveyor 38 motor B.C.M. to start and discharge material into the magazine under spout 34. The relatively high speed of the conveyor belt 42 moves large quantities of the material from the relatively large discharge opening of the gate valve 44 through the relatively small receiving opening 16 of the magazine without jamming.

The timer motor T.M. is set to run for just a little less time than it takes for the belt 42 to charge the magazine and then it times out. When it times out it opens the N.C. timer switch T.S. which de-energizes T.R. and causes it to assume its former position which breaks its holding circuit; de-energizes S.V.–1; energizes S.V.–2 to close gate valve 44 which closes L.S.–2; approximately two seconds later D.R.–2 which is now energized opens to stop the belt conveyor motor B.C.M., and finally energizes D.R.–1 which another second later closes to start conveyor motor C.M. which starts conveyor 12 and the cycle repeats until M.S.–1 is opened.

Where very large magazines are being used, the capacity of the system can be doubled or more by using two or more of the magazine feeder systems just described in parallel and correspondingly placing an extension 50 only on every other or more magazines so as to simultaneously fill two or more magazines and then advance all of the magazines so filled until empty magazines come up under the spouts.

M.S.–3 is to operate S.V.–1 so as to open the gate valve 44 when desired without doing anything else, and M.S.–2 is to operate S.V.–2 to close gate valve 44 without doing anything else.

It can thus be seen that the conveyor system of the present invention is capable of carrying any bulk material in substantially any quantity within reason regardless of how delicate, sluggish, or abrasive it might be and regardless of how great its angle of repose.

The foregoing specification is to be interpreted as descriptive only and not limitative as many changes and modifications can be made in the physical embodiment described without departing from the spirit of the invention.

The invention having been described, what is claimed is:

1. A material handling system comprising a power driven main conveyor, covered material carrying magazines supported for movement with said main conveyor, each of said magazines having a narrow material receiving opening near its covered top, a feeder conveyor positioned near said opening, a drive for moving said feeder conveyor at a speed so as to forcibly directly project material through said narrow receiving opening substantially without contacting anything before passing through said opening and at a higher volumetric rate than could be obtained by gravity flow, a movable closure for said opening, means for opening said closure prior to said opening reaching said feeder conveyor and for closing said closure after said opening passes said feeder conveyor, and means for supplying material to said feeder conveyor.

2. A material handling system as specified in claim 1 in which the means for supplying material to said conveyor comprises a gate valve.

3. A material handling system as specified in claim 2 in which the gate valve is "dribble-free" for bulk material.

4. A material handling system as specified in claim 2 in which the gate valve is power actuated.

5. A material handling system as specified in claim 4 also including an integrated control system for the power drives which when a magazine is charged first closes the gate valve, then after a short delay stops the feeder conveyor, and then starts the main conveyor.

6. A material handling system as specified in claim 5 in which the gate valve is "dribble-free" for bulk material.

7. A material handling system comprising a main conveyor, a material holding magazine carried for movement with said conveyor, said magazine having substantially cylindrically shaped side areas and ends at right angle to said areas, a side area having a narrow, high positioned material receiving opening therein, a belt feeder conveyor for projecting material through said opening and into said magazine, a closure plate for said opening curved to correspond to the cylindrical shape of said side area having the opening, and an arm attached to each end of said plate and pivoted to a magazine end at such a point that when the plate is in closed position it is sprung slightly to hold it into tight contact with said side area to tightly close said material receiving opening.

8. A material handling system as specified in claim 7 in which said magazine is also provided with a bottom substantially cylindrical section having a discharge opening therein, a closure plate for said discharge opening which is also curved so as to correspond to the cylindrical shape of said bottom section, and an arm attached to each end of said closure plate and pivoted to a magazine end at such a point that when the closure plate is closed it is sprung slightly to hold it into tight contact with said bottom section to tightly close said discharge opening.

References Cited

UNITED STATES PATENTS

| | | | |
|---|---|---|---|
| 675,657 | 6/1901 | Hoshor | 198—63 |
| 751,890 | 2/1904 | Willson | 198—58 |
| 861,505 | 7/1907 | Deesz | 198—63 |
| 1,052,253 | 2/1913 | Horst | 198—152 |
| 1,300,710 | 4/1919 | Edwards | 220—32 |
| 1,325,269 | 12/1919 | Stanley | 220—32 |
| 3,017,039 | 1/1962 | Schwing | 198—56 X |
| 3,266,621 | 8/1966 | Leach | 198—177 |

FOREIGN PATENTS

| | | |
|---|---|---|
| 1,365,027 | 5/1964 | France. |
| 589,601 | 6/1947 | Great Britain. |

EVON C. BLUNK, *Primary Examiner.*

M. L. AJEMAN, *Assistant Examiner.*